Jan. 12, 1926. 1,569,184
M. HERRING
DETACHABLE HANDLE
Filed August 28, 1923
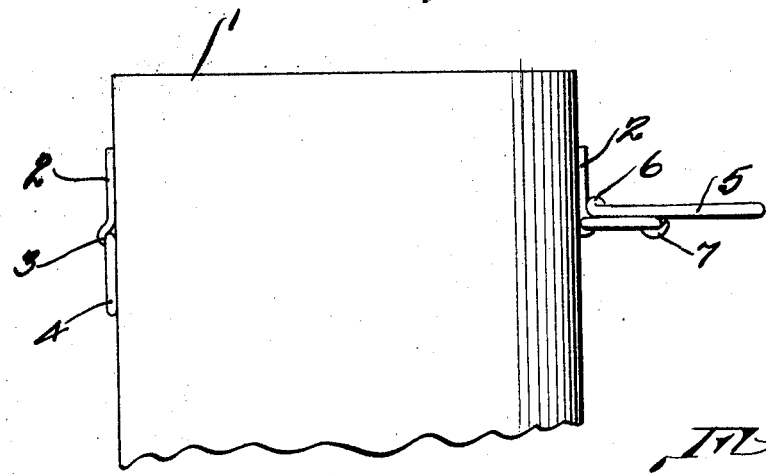
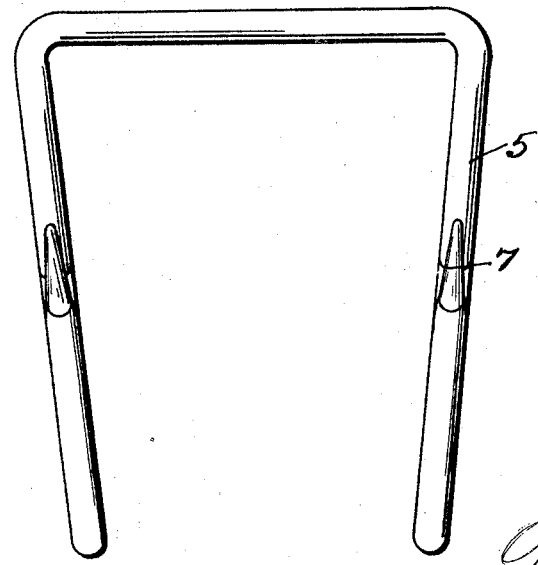
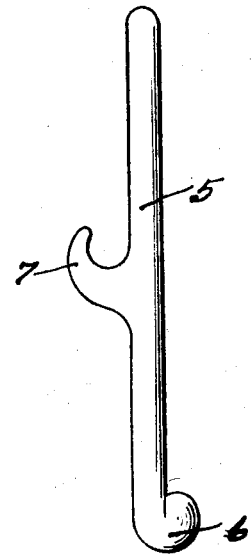
Inventor
Max Herring Patented Jan. 12, 1926.

1,569,184

UNITED STATES PATENT OFFICE.

MAX HERRING, OF WAUKEGAN, ILLINOIS.

DETACHABLE HANDLE.

Application filed August 28, 1923. Serial No. 659,806.

*To all whom it may concern:*

Be it known that I, MAX HERRING, a citizen of the United States, residing at Waukegan, in the county of Lake and State of Illinois, have invented certain new and useful Improvements in Detachable Handles, of which the following is a specification.

This invention relates to improvements in handles and has for its principal object to produce a detachable cold handle for the purpose of removing heated receptacles from a stove or oven.

Another object of the invention is to provide an adjustable cold handle having a hook formed thereon intermediate its ends for engaging the handles of a receptacle thereby eliminating the necessity of grasping the heated permanent handles provided on the receptacle.

A still further object of this invention is to provide a removable cold handle for engaging the permanent handles of a heated receptacle to eliminate any danger of burning the hands of the operator.

Referring to the drawings wherein like characters of reference denote corresponding parts, Figure 1 is a side elevation of the invention as applied to the handles of a receptacle, Figure 2 is a front elevation of the invention, and Figure 3 is an enlarged detail view of one of the side arms.

Referring now to the drawing wherein like characters of reference denote like or correspondings parts, the numeral 1 indicates a receptacle having metallic members 2 formed thereon and the lower ends of said members are bent to provide openings 3 to receive the permanent handle portions 4 of the receptacle, which when not in use engage the sides of said receptacle.

My invention consists of a detachable cold handle 5 of U-shape having the free ends thereof upturned as at 6 for engaging the metallic members 2 to permit the user of the device to obtain a secure grip on the permanent handles. The removable handle has hooks 7 formed thereon intermediate its ends which are designed to engage a portion of the handles of the receptacle, so that the heated receptacle may be removed from a stove or oven and thereby eliminate any danger of burning the hands of the operator.

When it is desired to remove a receptacle from the stove, it is simply necessary that the operator of the detachable cold handles place the same over the permanent handles so that the upturned portions will abut the metallic members and the hooked portion of the detachable handles will engage the underside of the handles which are carried by the receptacle, so that the user of the device may obtain a secure grip for the purpose of carrying the heated receptacle from the stove.

Minor changes may be resorted to without departing from the spirit and scope of the invention as claimed, and therefore, I do not wish to limit myself to the exact details of construction shown, nor to the combination and arrangement of parts.

What I claim is:

A detachable handle consisting of a substantially U-shaped bar the side portions of which are provided at their ends with return bent portions folded back in close contact with the surfaces of the side portions and forming compact abutting heads, the side portions being provided at their opposite sides and at points between their ends with pointed hooks the pointed ends of which are disposed towards the intermediate portion of the bar.

In testimony whereof, I have affixed my signature.

MAX HERRING.